US010601924B2

(12) United States Patent
Hu et al.

(10) Patent No.: US 10,601,924 B2
(45) Date of Patent: Mar. 24, 2020

(54) METHOD FOR REMOTE SUPPORT OF ELECTRIC DRIVE APPARATUS

(71) Applicant: ABB Technology Oy, Helsinki (FI)

(72) Inventors: Zhongliang Hu, Espoo (FI); Jarkko Lalu, Helsinki (FI)

(73) Assignee: ABB Schweiz AG, Baden (CH)

( * ) Notice: Subject to any disclaimer, the term of this patent is extended or adjusted under 35 U.S.C. 154(b) by 226 days.

(21) Appl. No.: 15/805,115

(22) Filed: Nov. 6, 2017

(65) Prior Publication Data

US 2019/0141134 A1    May 9, 2019

(51) Int. Cl.
G06F 15/173 (2006.01)
G06F 15/16 (2006.01)
H04L 29/08 (2006.01)
G05B 19/4069 (2006.01)
G06F 9/455 (2018.01)
H04L 29/06 (2006.01)

(52) U.S. Cl.
CPC ........ H04L 67/125 (2013.01); G05B 19/4069 (2013.01); G06F 9/45558 (2013.01); H04L 65/1069 (2013.01); G06F 2009/45579 (2013.01); G06F 2009/45595 (2013.01)

(58) Field of Classification Search
CPC ............. H04L 65/1069; H04L 65/4015; H04L 67/125; G06F 2009/45579
USPC ................................ 709/223–224, 227–228
See application file for complete search history.

(56) References Cited

U.S. PATENT DOCUMENTS 9,860,108 B2 * 1/2018 Castine ................ H04L 67/125
10,402,216 B1 * 9/2019 Bell ........................ G06F 8/60
2005/0102054 A1   5/2005 Dolansky
2006/0265656 A1 * 11/2006 Lambert ................ G06Q 10/00
                                                        715/705
2009/0299509 A1  12/2009 Diezel et al.
2012/0303823 A1 * 11/2012 Nair ....................... H04W 48/16
                                                        709/227

(Continued)

FOREIGN PATENT DOCUMENTS

DE    102007045595 A1    3/2009

OTHER PUBLICATIONS

European Patent Office, Extended European Search Report issued in corresponding European application No. 18203024.7, dated Apr. 8, 2019, 7 pp.

Primary Examiner — Bharat Barot
(74) Attorney, Agent, or Firm — Taft Stettinius & Hollister LLP; J. Bruce Schelkopf

(57) ABSTRACT

The invention relates to electric drive apparatuses used in different industries for different applications more particularly to a method for remote support of an electric drive apparatus. The method comprises: establishing a live support session with virtual drive assistance between a first apparatus and a third apparatus in the remote support site, said first apparatus having a connection with a local electric drive apparatus in a local site, and said third apparatus having a connection to a virtual drive tool for virtual drive assistance; downloading by said third apparatus from said first apparatus parameter settings and other relevant process information of the local electric drive apparatus to said third apparatus; and controlling and/or operating said virtual drive tool by said third apparatus to provide assistance to a user of said first apparatus.

18 Claims, 6 Drawing Sheets

(56) References Cited

U.S. PATENT DOCUMENTS

| | | | |
|---|---|---|---|
| 2015/0040127 A1* | 2/2015 | Dippenaar | G06F 9/4856 718/1 |
| 2016/0173816 A1* | 6/2016 | Huenerfauth | H04L 65/4015 348/14.02 |
| 2017/0308057 A1 | 10/2017 | Kreidler | |

* cited by examiner

METHOD FOR REMOTE SUPPORT OF ELECTRIC DRIVE APPARATUS

FIELD OF THE INVENTION

The invention relates to electric drive apparatuses used in different industries for different applications more particularly to a method for remote support of an electric drive apparatus.

BACKGROUND OF THE INVENTION

Electric drives are used in industry for different applications, such as for driving motors within the transportation industry, for driving different devices within the process and manufacturing industry as well as within the energy industry. There are applications commonly used for electric drives within the transportation industry for example in metro and railway traffic applications as well as in ship propulsion unit applications of the marine industry. Within the process and manufacturing industry, electric drives can be used for example in conveyor applications, in mixer applications or even in paper machine applications. Within the energy industry, electric drives can be used for example as electric drives for wind turbines of the wind power industry and as electric drives of the solar power industry.

Electric drives for electric motors may be divided into DC motor drives (DC, direct current) and AC drives (AC, alternating current). In a DC motor of a DC motor drive, a magnetic field is generated by the current through the field winding in the stator. This magnetic field is always maintained at right angles to the field generated by the armature winding. In this way, a DC motor's torque is generated, which torque can then be easily controlled in a DC motor drive by changing the armature current and keeping the magnetizing current constant. In a DC motor drive, also the DC motor speed can be controlled directly through armature current.

Within electric drives, the AC drives may further be divided into frequency-controlled AC drives, flux-vector-controlled AC drives and into AC drives utilising direct torque control (DTC, Direct Torque Control). In flux-vector-controlled AC drives and in direct torque control AC drives the torque of the three-phase motor can be controlled, whereas in frequency controlled AC drives the load dictates the torque level.

The evolvement of communication technology, particularly wireless communication technology and end user devices, has enabled versatile communication possibilities and introduction of different services. An example of such a service is a remote support for maintenance staff of machines and equipment such as electric drive apparatuses. There are smartphone applications that allow a user of the smartphone to receive service recommendations for a machine, store operational data on the machine over the network connection, and troubleshoot the machine, for example, from a service center.

BRIEF DESCRIPTION OF THE INVENTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

Some embodiments provide methods, apparatuses, a system and a computer program product for providing possibility to obtain a live support from a remote service operator.

BRIEF DESCRIPTION OF THE DRAWINGS

In the following, the present invention will be described in greater detail by way of example and with reference to the accompanying drawings, in which.

The foregoing aspects, features and advantages of the invention will be apparent from the drawings and the detailed description related thereto.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

The present invention is applicable to any piece of a system and the system that comprises one or more service centers or service desk equipment configurable to transmit instructions and recommendations to a remote user apparatus. In the following, maintenance is used as an example of a remote service without restricting the examples to the maintenance.

Figure 1:
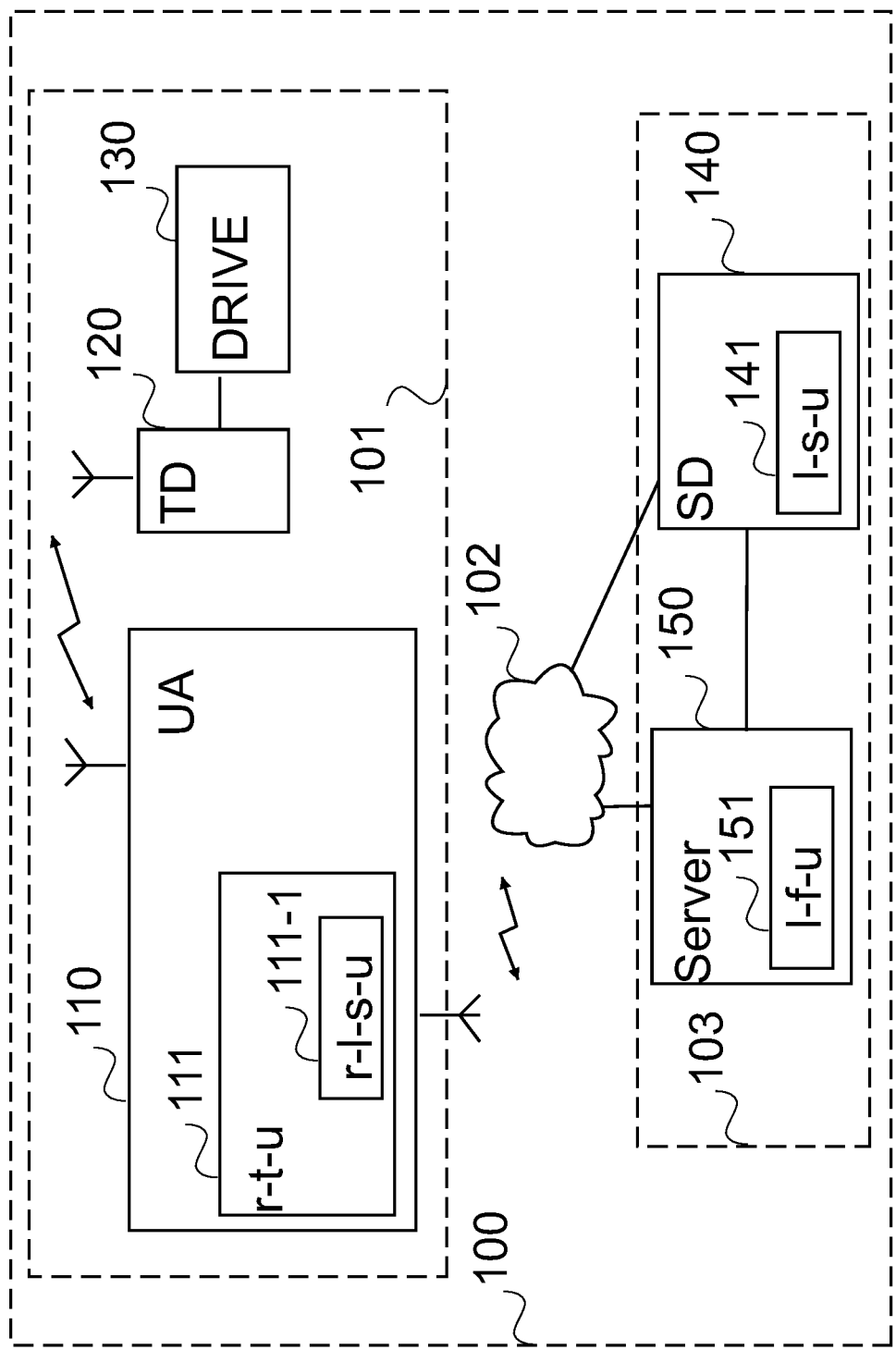
FIG. 1 illustrates simplified architecture of a system and block diagrams of some apparatuses according to an exemplary embodiment of the present invention.

FIG. 1 simplified architecture of a system and block diagrams of some apparatuses according to an exemplary embodiment of the present invention. An extremely general architecture of an exemplary system 100 is illustrated in FIG. 1. FIG. 1 is a simplified system architecture only showing some elements, functional entities, which are logical units whose implementation may differ from what is shown, and some equipment. It is apparent to a person skilled in the art that the system may comprise any number of shown elements, other equipment, other functions and structures that are not illustrated.

In the embodiment illustrated in FIG. 1, the system 100 comprises one or more industrial sites 101 (only one illustrated in FIG. 1) connected over one or more networks 102 to one or more service centers 103 (only one illustrated in FIG. 1) and to one or more service desks 140 (only one illustrated in FIG. 1) either directly over one or more networks 102 or via the service center.

In the illustrated example the industrial site 101 comprises a user apparatus 110 of a remote user as visiting equipment, and a terminal device 120 and an electric drive apparatus (drive) 130 as permanent equipments. The permanent equipment means herein equipment that is intended to locate in the industrial site a long time, whereas the visiting equipment means equipment that is intended to visit the industrial site temporarily. However, it should be appreciated that the user apparatus 110 may be permanent equipment as well. Further, it should be appreciated that the terminal device and the drive depicts herein any device, machine, equipment, system and a process that whose operations and/or service and/or maintenance may be taken care remotely. Other examples of such equipment include frequency converters, AC/DC modules, DC/AC modules, programmable logic controllers, switches, motion controllers or motion drives, servo motors, soft starters, robots, cars, and heavy equipment, etc. It should be appreciated that in the above only some examples are listed.

The user apparatus 110 refers to a computing device (equipment), that may be a non-portable device or a portable device (mobile device), and it may also be referred to as a user terminal or user device. Portable computing devices (apparatuses) include wireless mobile communication devices operating with or without a subscriber identification module (SIM) in hardware or in software, including, but not limited to, the following types of devices: mobile phone, smart-phone, personal digital assistant (PDA), laptop and/or touch screen computer, tablet (tablet computer), multimedia device, wearable computer and other types of wearable devices, such as clothing and accessories incorporating computer and advanced electronic technologies. The user apparatus 110 is configured to support remote maintenance. For that purpose the user apparatus 110 comprises a remote support application provided by a remote tool unit (r-t-u) 111 (may also be called a remote support tool unit), and its sub-unit remote live support unit (r-l-s-u) 111-1 whose functionality will be described in more detail below with FIGS. 3 and 4.

In the illustrated example the user apparatus has at least two communications interfaces, depicted by 2 antennas, one to connect to the service center 103 wirelessly over one or more networks 102 and one to connect to the terminal device 120 over a local connection. The wireless connection to the service center may be provided by any mobile system, such as GSM, GPRS, LTE, 4G, 5G and beyond, or a combination of a mobile system and a fixed system, like Wi-Fi or Li-Fi providing access to internet and via internet to the service center. The local connection may be provided naturally over a mobile system but it may be provided by a direct connection, for example using Bluetooth, or by a local network, like Wi-Fi or Li-Fi. It should be appreciated that the user apparatus 110 is depicted to include 2 antennas only for the sake of clarity. The number of reception and/or transmission antennas, or other communication interfaces, may naturally vary according to a current implementation, and the user apparatus type.

The terminal device 120 refers herein to equipment via which parameters of the drive 130 may be adjusted or acquired, and the functions of the drive 130 otherwise controlled by a person locating on the site and/or remotely from the service center. In other words, the terminal device is a module providing at least a wireless interface to which the user apparatus may connect to. The terminal device 120 may be a separate device (as in the illustrated example), or a device detachable connectable to the drive, or equipment integrated to the drive. At the simplest the terminal device may be the mere wireless interface. Other examples of the terminal device include a control panel, smartphone, mobile phone, tablet or laptop computer. At least in the solutions in which the terminal device 120 is not integrated with the drive 130, the terminal device 120 may be located on-site at a close proximity of the drive 130 to which a connection may be provided via a communication interface by Bluetooth, NFC, WiFi, Li-Fi, and/or inductive connection (such as an inductive connection according to an inductive power standard (Qi) by the Wireless Power Consortium), for example.

In the illustrated example of FIG. 1 the drive 130 is equipment performing the functionality of a drive according to its settings and has a communication interface via which its parameters may be adjusted or acquired by means of the terminal device 120.

The one or more networks 102 (communications networks) may comprise one or more wireless networks, wherein a wireless network may be based on any mobile system, such as GSM, GPRS, LTE, 4G, 5G and beyond, or a wireless local area network, such as Wi-Fi, Li-Fi. Further, the one or more networks 102 may comprise one or more fixed networks and internet.

In the illustrated example the service center 103 comprises a service desk 140 and a server 150. The service desk 140 may be any combination of any user interface, like touch screen or combination of a display and a keypad, and any computing apparatus. Examples of such apparatuses include a work station, a laptop computer, a personal computer, a wearable computer and a display connected to the server 150. The service desk 140 is configured to support the live remote maintenance. For that purpose the service desk 140 comprises a live support unit (l-s-u) 141 whose functionality will be described in more detail below, and a connection to the server 150. The service desk 140 may be configured to have a connection to the site via the server and/or over one or more networks 102, and the network(s) used may be different than those used by the server 150.

The server 150, like a cloud server or a grid server, refers herein to a combination of a data storage and a data management system. The data storage may be any kind of conventional or future data repository, including distributed and centralized storing of data, a cloud-based storage in a cloud environment, managed by any suitable management system. The implementation of the data storage, the manner how data is stored, retrieved and updated are irrelevant to the invention, and therefore not described in detail here. The server 150 is configured to support the live remote maintenance. For that purpose the server 150 comprises a live feed unit (l-f-u) 151 whose functionality will be described in more detail below, a connection to service desks 150 and a connection over the one or more networks 102 to the site.

In a typical of electric drive apparatus setup the control software of the electrical drive is usually executed on the specific central processing unit (CPU) which control software is typically embedded very closely to drive hardware.

Control software has multiple tasks to control the drive based on physical inputs and outputs.

Figure 2:
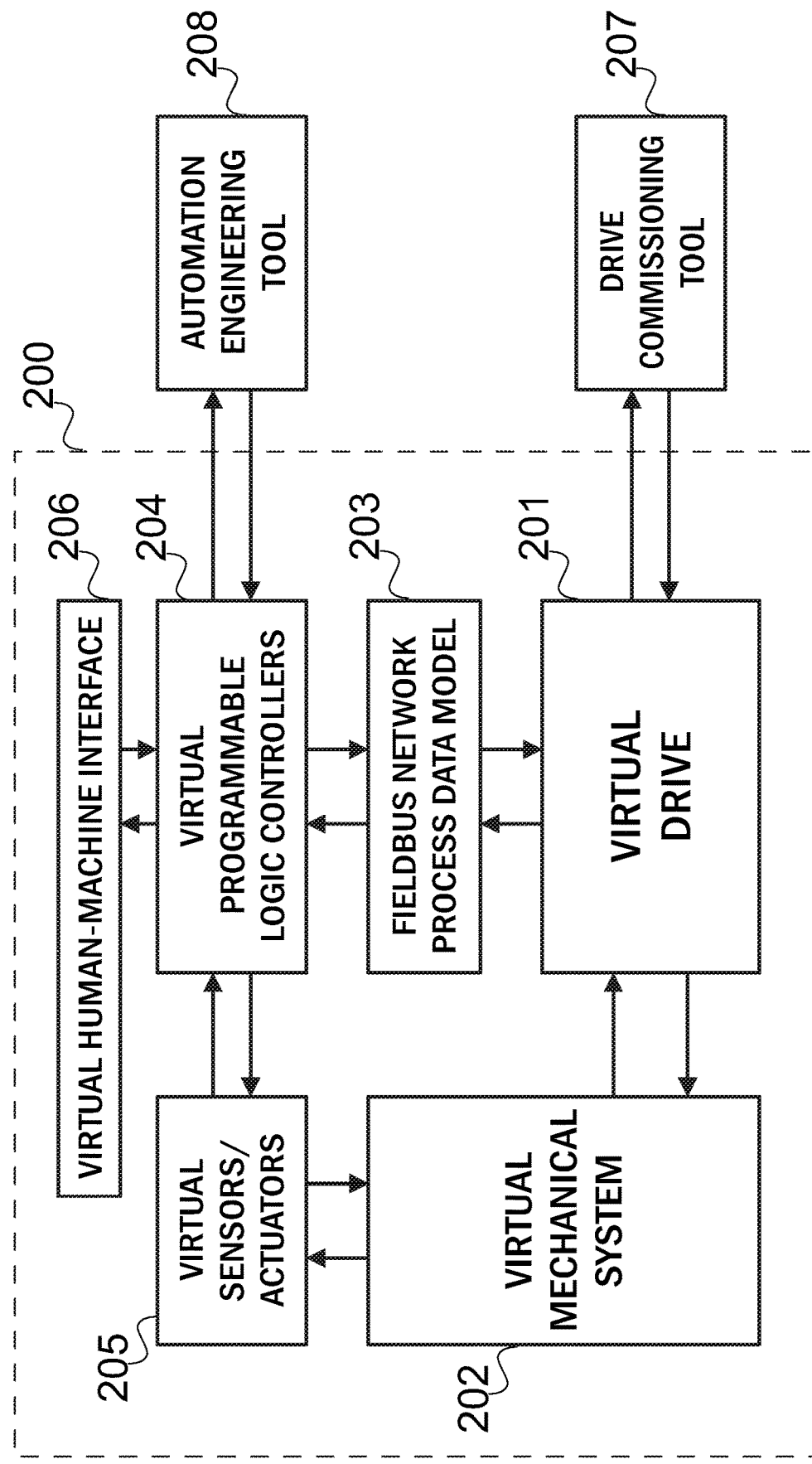
FIG. 2 illustrates one example of a virtual drive simulation environment according to one embodiment of the present invention.

FIG. 2 illustrates one example of a virtual drive simulation environment according to one embodiment of the present invention. The virtual drive simulation environment according to presented embodiment comprises a virtual drive tool 200, which virtual drive tool 200 comprises a virtual drive 201. Virtual drive 201 is a hardware independent implementation of the electrical drive control software. A major portion of the control software and operating system software of the virtual drive 201 are equal to or emulated to be equal to the control software and operating system software of the real drive. All inputs and outputs between the electrical drive and the hardware are 'virtualized' to the virtual drive simulation environment. The virtual drive simulation environment according to presented embodiment comprises a virtual mechanical system 202 and a fieldbus network process data model 203 connected to the virtual drive 201. Said virtual mechanical system 202 may e.g. be a virtual animated model of a real drive installation comprising e.g. a handled load and load handling environment with associated sensors, actuators and limiters. The virtual drive simulation environment according to presented embodiment also comprises virtual programmable logic controllers 204 connected to the virtual drive 201 through the fieldbus network process data model 203. Furthermore, the virtual drive simulation environment according to presented embodiment comprises virtual sensors/actuators 205 between the virtual mechanical system 202 and the virtual programmable logic controllers 204 and a virtual human-machine interface 206 connected to the virtual programmable logic controllers 204. Depending on use of the virtual drive tool part 200-206 of the virtualized inputs and outputs can be connected to corresponding virtualize counterpart device 200-206.

In a virtual drive simulation environment according to presented embodiment the virtual drive 201 is controlled and/or operated through a connection to a drive commissioning tool 207. Said drive commissioning tool 207 is a standard drive commissioning and programming tool used for controlling and/or operating real drives. With the help of said virtualization environment the user can build virtual model of the process and connect virtual drive 201 to that. The virtual drive simulation environment according to presented embodiment may also comprise one or more automation engineering tools 208 connected to the virtual programmable logic controllers 204 which automation engineering tools 208 are used for controlling and/or operating said virtual programmable logic controllers 204. Said automation engineering tools 208 are standard automation engineering tools used for controlling and/or operating real programmable logic controllers. Said drive commissioning tool 207 and said one or more automation engineering tools 208 can be connected and operated together. There can be also other kind of virtual controllers, which can be connected together and executed in same common synchronized virtual time base.

Figure 3:
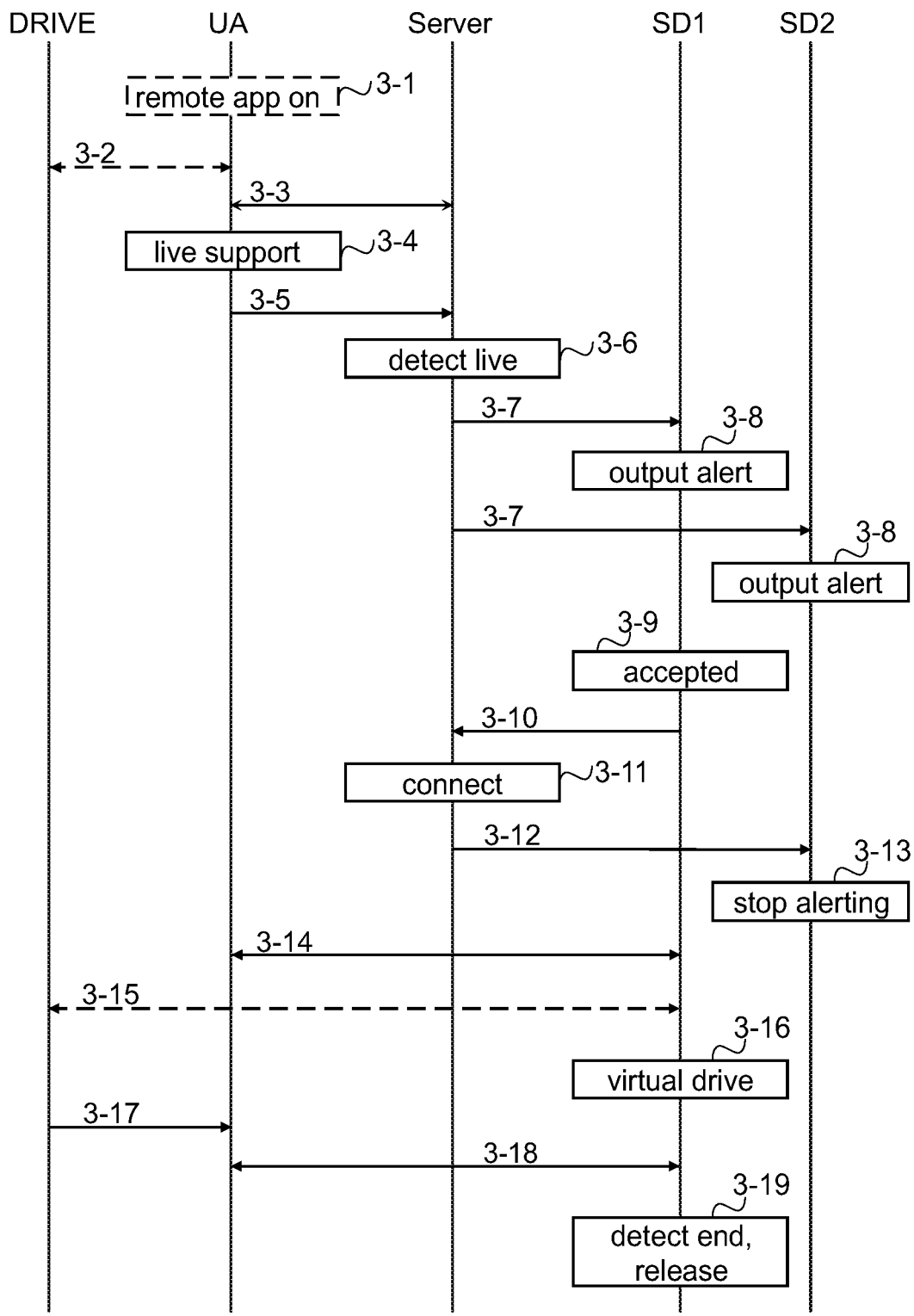
FIG. 3 illustrates exemplary information exchange according to an exemplary embodiment of the present invention.

FIG. 3 illustrates exemplary information exchange according to an exemplary embodiment of the present invention. FIG. 3 illustrates information exchange in an exemplary situation in which a remote live session with virtual drive assistance is established between a user of a user apparatus UA in a site, and an operator of a service desk SD1, the remote live session being established via a server supporting remote maintenance for example. Further, in the illustrated example it is assumed that the terminal device is integrated into the drive, and that they function as one unit, the drive. Further, in the example it is assumed that alerting is triggered by sending a corresponding message and the alerting is continued as long as a message stopping alerting is received. However, it is a straightforward solution to implement the functionality disclosed below to a solution in which alerting is continued as long as alerting messages are received (and naturally sent) at a certain intervals. It should be appreciated that any known or future communication protocol and process to establish a session/connection may be used. Therefore they are not described in detail herein.

Referring to FIG. 3, when the user starts the remote tool application, remote app, (point 3-1), a local connection to the drive is establish (messages 3-2, denoted by a dash line) and a connection to the server (messages 3-3). The server is a back-end server to the remote tool application, and hence the server's address is known by the remote tool application. However, unlike in prior art solution, the user apparatus outputs in the remote tool application a possibility to start a live support with virtual drive assistance, and once a user input selecting to start a live support session is detected in point 3-4, the remote live support unit is started and the remote live support unit causes transmission of a request for live support session in message 3-5 to the server.

The server detects in point 3-6 that instead of retrieving information or storing information, the user apparatus sent a request for a live support session. Therefore the server starts the live feed unit for the session (unless it is already running), and the live feed unit triggers session establishment by causing sending session invitations 3-7, or corresponding session establishment requests, to service desks SD1, SD2. The service desks to whom invitations 3-7 are sent may be selected freely. For example, the server, or more precisely the live feed unit, may send invitations to each service desk coupled to the server, or whose address information the server knows, or to a subset of the service desks. For example, certain sites and/or drives may be associated with certain service desks, and/or certain users may be associated with certain service desks, such association information being maintained in the server, for example, retrievable by the live feed unit.

When a service desk SD1, SD2 receives the invitation for a live support session, the live support unit is started (unless it is already running), and an alert is outputted in point 3-8 via a user interface so that an operator of the service desk may notice (see and/or hear and/or feel) the alert.

In the illustrated example the service desk SD 1 receives in point 3-9 as an operator (user) input an acceptance to the invitation. In other words, the operator answered to the alert. Therefore the live support unit causes sending the acceptance in message 3-10.

Upon receiving message 3-10, the live feed unit in the server detects that SD1 accepts the session invitation, and therefore causes in point 3-11 the user apparatus and the service desk SD1 to connect to each other. Typically the connection passes via the server. However, it is possible that within the session a voice call is established directly between the user apparatus and the service desk, while the session is maintained between the user apparatus and the server, or the session is extended to be between the user apparatus and the service desk, via the service desk. For example, in a multimedia call, voice path may be over a direct connection between the user apparatus and the server, while image information, and other data information passes via the server. Further, the live feed unit informs (message 3-12) the other service desks to stop alerting. Upon receiving message 3-12 the live support unit in the service desk detects that alerting should be stopped, stops in point 3-13 the alerting, and shuts itself (unless needed for other user apparatuses).

Meanwhile the live session has been established between the service desk SD1 and the user apparatus, messages 3-14 illustrating session establishment and information exchange between them (or the live support tool and the remote live support tool). Since the user apparatus has a connection to the drive, a connection is, in the illustrated example, established also between the service desk SD1 (or the live support tool) and the drive so that the service desk SD1 has access to the drive and may obtain information directly from the drive and/or store information and/or set parameters, or service counters, etc. directly to the drive, messages 3-15 illustrating the connection establishment and information exchange between them. Preferably, if a connection is established between the service desk and the drive, via the user apparatus, the user of the user apparatus is prompted to approve access from the service desk to the drive. This provides safety against fraudulent use. However, the user apparatus, or the remote live support unit, may be configured to allow the service desk access to the drive without user approval. Further, it should be appreciated that a connection between the service desk and the drive is not necessary, and hence may not exits. The same applies to the connection between the user apparatus and the drive: a live support session may be between the user apparatus and the service desk also when there is no local connection from the user apparatus to the drive.

To have a direct connection from the user apparatus to the drive, and a direct connection from the service desk to the drive, enables versatile possibilities. For example, the user in the drive site may, while chatting with the operator, to execute a script with the drive, and after that also comment the result of that. The operator may, thanks to the direct connection to the drive, request or retrieve information from the drive directly, without first describing what he/she wants to have to the user of the user apparatus. Further, the operator may cause command(s) and/or actions to be performed, and/or scripts run on the drive without the user of the user apparatus being involved or noticing anything. However, thanks to the live support session, the operator may ask the user the end result of the "direct drive manipulation". Hence this improves the customer support quality and will decrease the malfunction time, or at least average time the drive cannot be used, hence increasing productivity.

During the live remote support session either the operator or the user provides as a user input "start virtual drive assistance". In response to receiving, or detecting in point 3-16 information indicating to starting of virtual drive assistance the virtual drive tool is started on the service desk SD1. Alternatively, the operator of the service desk, e.g. the remote service engineer, can start the virtual drive tool located on another server. The messages 3-17 illustrates the downloading of parameter settings and other relevant process information from the real drive to the user apparatus UA. The messages 3-18 illustrates the information exchange and forwarding of parameter settings and other relevant process information downloaded from the real drive being forwarded by the user application UA being downloaded to the virtual drive tool running on the service desk SD1. When the parameter settings and other relevant process information from the real drive forwarded by the user application UA have been downloaded to the virtual drive tool running on the service desk SD1 the operator of the service desk, e.g. the remote service engineer, may then control and operate the virtual drive tool.

The downloaded parameter settings may include parameters including but being not limited to: drive model parameters, drive component version parameters, functional drive parameters (including drive motor rating parameters), physical drive parameters, drive test parameters (including drive motor ID run result parameters), user generated parameters, drive application generated parameters, drive accessory parameters, drive optional module/hardware parameters (including field bus module parameters, functional safety module parameters, braking chopper parameters, I/O module parameters). The parameter settings may also include drive applications. The other relevant process information may include load information, torque information, motor speed information, power consumption information, or any other relevant process information.

The virtual drive tool combines the main drive model with the real parameter settings and becomes a virtual representation of the real drive in question. The operator of the service desk can then make experiments on the virtual instance of the real drive without risks while verifying the solution before propose to the real drive user. After the operator of the service desk has found the correct parameter settings and/or other issues that need to be fixed to resolve customer support case, then the operator of the service desk can propose the change proposals to the local user of the drive with confidence and efficiency.

After a while either the operator or the user provides as a user input "end the live remote session". In response to receiving, or detecting in point 3-19 information indicating to end the session, the live feed unit releases in point 3-19 the session and the connection and resources reserved for them. Further, the live feed unit may shut down, unless needed for other corresponding sessions.

Figure 4:
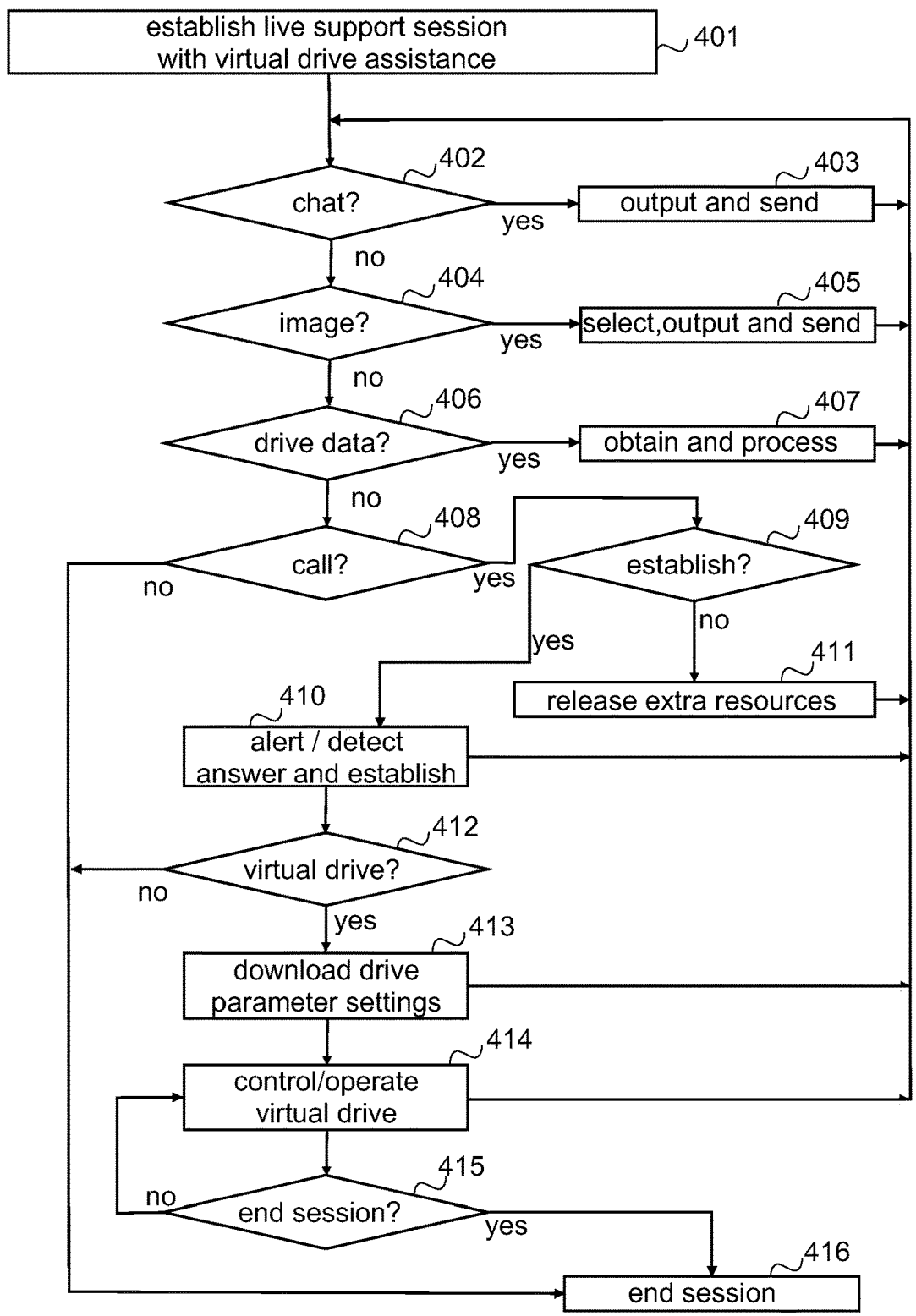
FIG. 4 is a flow chart illustrating exemplary of a live support session with virtual drive assistance according to an exemplary embodiment of the present invention.

FIG. 4 is a flow chart illustrating exemplary of a live support session with virtual drive assistance according to an exemplary embodiment of the present invention. FIG. 4 illustrates an exemplary functionality of the remote live support unit and/or the live support unit. The functionality of the two units is similar, and hence there is no need to describe them separately. Basically the only difference between the units are that the remote live support unit is run in an apparatus in a remote site (industrial site in FIG. 1), whereas the live support unit is run in an apparatus in a support site (service center in FIG. 1). In the example illustrated in FIG. 4 it is further assumed that the live support session is ended either in response to the user of the corresponding apparatus (user apparatus in the site, or the service desk) providing such an input, or corresponding input is received from the other apparatus with which the live support session has been established. For the sake of clarity, in the illustrated example it is assumed that if one of the parties call, the other one answers to the call. It should be appreciated that if the other one rejects the call, or the alerting stops before the other party has answered the call, no connection is established for the call.

Referring to FIG. 4, the live support session with virtual drive assistance is established in step 401, as described above with FIG. 3. After step 401, there is a session to the other apparatus and a connection to the drive. As the session goes on there is user input received either via a user interface (UI) of the apparatus or as received information from the other apparatus. In the illustrated example it is assumed that the user input or the received information from the other apparatus may relate to live chat, sharing images (images are used as an example of any data sharing, such as different documents, audio clips video clips, i.e. files of any type), to drive data, to a call (covering both a video call and a voice call) or to ending of a session. Further, it should be appreciated that the received information from the other apparatus may actually be also something else than a user input of the user of the other apparatus, herein the received information is interpreted to correspond to actual user input.

If the user input relates to live chat (step 402: yes), the inputted information, comprising text and/or characters and/or icons, for example, is outputted in step 403 on the user interface of the apparatus and sending the information is caused in step 403 to the other apparatus, so that the other party chatting sees the same information.

If the user input relates to images (step 402: no, step 404: yes), the user may be provided to select, whether to capture an image or use an existing image, and once the image is selected in step 405, either by capturing and/or selecting amongst existing images, or if an existing image is used, the image is outputted in step 405 on the user interface of the apparatus and sending the image is caused in step 405 to the other apparatus, so that the other party chatting sees the same image.

If the user input relates to drive data (step 404: no, step 406: yes), then the drive data is obtained and processed in step 407. For example, the remote application may cause reading (obtaining) fault codes and/or warnings and storing to the memory, setting parameters and/or service counters. The drive data may be shown to the user. Further, the remote application may cause showing the drive data to the user and/or forwarding the drive data to the service desk. In the service desk side, sending queries to obtain the drive data and/or parameter values and/or different instructions, like setting service counters, may be caused, for example.

If the user input relates to a call (step 406: no, step 408: yes), it either indicates that the user wants to establish a call or end an ongoing call. Herein establishment covers answering to an alerting call, or triggering a call establishment. If the user wants to establish a call (step 409: yes) by responding to an alerting call, establishing the call to be carried over the existing session is caused in step 410, and then the parties (the user of the user apparatus and the operator of the service desk) may hear, and in case of a video call also see, each other. If the user wants to establish a call (step 409: yes) by triggering a call establishment, alerting the other party (or parties) is caused in step 410, ending eventually to establishing the call to be carried over the existing session, and then the parties (the user of the user apparatus and the operator of the service desk) may hear, and in case of a video call also see, each other. It should be appreciated that the call may use another communication path than the live support session even though the call is established to be carried over the existing session. Even, when there is an ongoing call, the process returns to monitor, whether a user input is received via the user interface of the apparatus or as received information from the other apparatus. If the user does not want to establish a call (step 409: no), the user want to end an existing call. Therefore releasing the extra resources reserved for the call is caused in step 411, the releasing including sending corresponding information to the other apparatus.

If the user input indicates that the user wants to end the live support session (step 408: no), the live support session with virtual drive assistance is ended in step 416. However, if the process is run in the user apparatus, the remote support application is still running, and its use according to prior art possibilities may continue.

As is evident from the above, the user's view may comprise images, sent chats, and received chats, for example, in any order. The live support unit, and the remote live support unit, aggregates the different media types. This facilitates finding a solution and receiving a general view, since everything is in the aggregated format, one does not need to jump between an email and a chat application. This in turns decreases the time, at least an average time, the drive cannot be in use. The shorter the time the drive is not in use, the better the productivity is. It should be appreciated that the above illustrated different information types (media types) are only exemplary and it is a straightforward solution to implement the above description to other types of information. Any type of media format, including different multimedia formats, may be exchanged. Since there is no need to close the remote support application to use another application, like capturing a picture and sending it via email, or to dial a number for phone service, time is saved and use of false addresses or false numbers is avoided (thanks to the application being up and running and knowing the addresses). This all decreases the time the drive cannot be in use, and as said above, this increases productivity.

While in the live support session with virtual drive assistance according to presented embodiment the call establishment has taken place in step 410 the virtual drive tool is started by recognizing that the received information indicates that the starting of the virtual drive tool is wanted (step 412: yes). Thereafter the parameter settings and other relevant process information from the real drive to the virtual drive tool running on the server are downloaded in step 413 accordingly. After the download of the parameter settings and relevant process information the virtual drive is controlled/operated by the operator of the service desk, e.g. the remote service engineer in step 414 accordingly.

If the user input indicates that the user wants to end the live support session with virtual drive assistance (step 412: no or step 415: yes), the live support session with virtual drive assistance is ended in step 416. However, if the process is run in the user apparatus, the remote support application is still running, and its use according to prior art possibilities may continue.

The steps, points, related functions, and information exchanges described above by means of FIGS. 3 and 4 are in no absolute chronological order, and some of them may be performed simultaneously or in an order differing from the given one. Other functions can also be executed between them or within them, and other information may be sent. Some of the steps or points or part of the steps or points or one or more pieces of information can also be left out or replaced by a corresponding step, point or part of the step, point or one or more pieces of information. For example, it should be appreciated that the user input received via a user interface and/or as received information may relate only one, two or three of the examples mentioned above with FIG. 4, and/or further information exchange not expressly mentioned may be involved, using the above described principles.

The techniques and methods described herein may be implemented by various means so that a user apparatus/user device, a service desk/service desk device and/or a server/database server configured to support live remote support, that may be called also remote live user support, based on at least partly on what is disclosed above with any of FIGS. 3 and 4, including implementing one or more functions/operations of a corresponding user apparatus and/or service desk device and/or a server described above with an embodiment/example, for example by means of FIG. 3 or FIG. 4, comprises not only prior art means, but also means for implementing the one or more functions/operations of a corresponding functionality described with an embodiment, for example by means of FIG. 3 or FIG. 4, and it or they may comprise separate means for each separate function/operation, or means may be configured to perform two or more functions/operations. For example, one or more of the means and/or the remote tool unit, or at least the remote live support unit and/or the live support unit and/or the live feed unit described above may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, logic gates, other electronic units designed to perform the functions described herein by means of FIG. 3 or FIG. 4, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Figure 5:
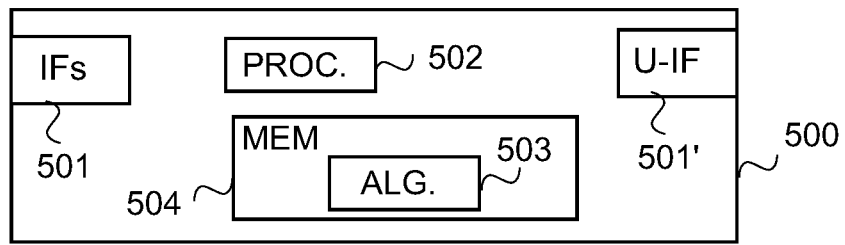
FIG. 5 illustrates an apparatus according to some embodiments of the present invention in connection with the user apparatus/user device.

FIG. 5 illustrates an apparatus according to some embodiments of the present invention in connection with the user apparatus/user device. FIG. 5 illustrates an apparatus configured to carry out the functions described above in connection with the user apparatus/user device. Each apparatus 500 may comprise one or more communication control circuitry, such as at least one processor 502, and at least one memory 504, including one or more algorithms 503, such as a computer program code (software) wherein the at least one memory and the computer program code (software) are configured, with the at least one processor, to cause the apparatus to carry out any one of the exemplified functionalities of the user apparatus. The apparatus may further comprise different communication interfaces 501 and one or more user interfaces 501'.

Referring to FIG. 5, at least one of the communication control circuitries in the apparatus 500 is configured to provide the remote tool unit, or at least the remote live support unit, or any corresponding sub-unit, and to carry out functionalities, described above by means of FIG. 3 or FIG. 4, by one or more circuitries.

Figure 6:
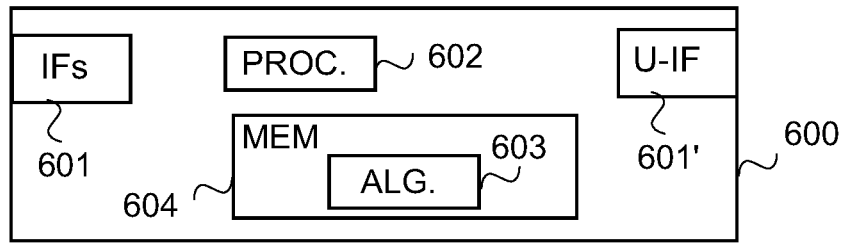
FIG. 6 illustrates an apparatus according to some embodiments of the present invention in connection with the service desk.

FIG. 6 illustrates an apparatus according to some embodiments of the present invention in connection with the service desk. FIG. 6 illustrates an apparatus configured to carry out the functions described above in connection with the service desk. Each apparatus 600 may comprise one or more communication control circuitry, such as at least one processor 602, and at least one memory 604, including one or more algorithms 603, such as a computer program code (software) wherein the at least one memory and the computer program code (software) are configured, with the at least one processor, to cause the apparatus to carry out any one of the exemplified functionalities of the service desk. The apparatus may further comprise different communication interfaces 601 and one or more user interfaces 601'.

Referring to FIG. 6, at least one of the communication control circuitries in the apparatus 600 is configured to provide the live support unit, or any corresponding sub-unit, and to carry out functionalities, described above by means of FIG. 3 or FIG. 4, by one or more circuitries.

Figure 7:
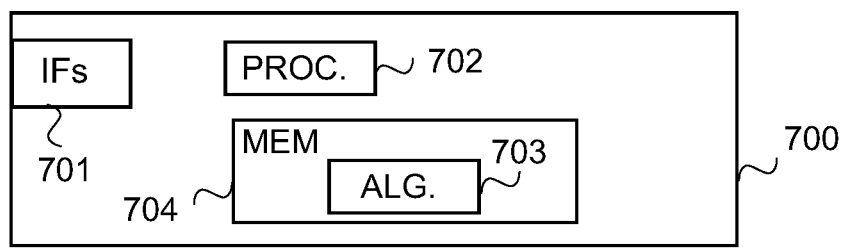
FIG. 7 illustrates an apparatus according to some embodiments of the present invention in connection with the server.

FIG. 7 illustrates an apparatus according to some embodiments of the present invention in connection with the server. FIG. 7 illustrates an apparatus configured to carry out the functions described above in connection with the server. Each apparatus 700 may comprise one or more communication control circuitry, such as at least one processor 702, and at least one memory 704, including one or more algorithms 703, such as a computer program code (software) wherein the at least one memory and the computer program code (software) are configured, with the at least one processor, to cause the apparatus to carry out any one of the exemplified functionalities of the server. The memory 704 may comprise a database for storing different information, for example contact information on apparatuses, and information needed for maintenance. The apparatus may further comprise different communication interfaces 701.

Referring to FIG. 7, at least one of the communication control circuitries in the apparatus 700 is configured to provide the live feed unit or any corresponding sub-unit, and to carry out functionalities, described above by means of FIG. 3, by one or more circuitries.

The memory 504, 604, 704 or part of it may be implemented using any suitable data storage technology, such as semiconductor based memory devices, flash memory, magnetic memory devices and systems, optical memory devices and systems, fixed memory and removable memory.

The one or more communication interfaces (TX/RX) 501, 601, 701 may comprise hardware and/or software for realizing communication connectivity according to one or more communication protocols. The communication interface 501, 601, 701 may comprise standard well-known components such as an amplifier, filter, frequency-converter, (de)modulator, and encoder/decoder circuitries and one or more antennas. The communication interfaces 501, 601, 701 may comprise radio interface components and/or other wireless interface components providing the apparatus with wireless communication capability.

A user interface 501', 601' may be any kind of a user interface, for example a screen, microphone, headset, head-mounted display, and/or one or more loudspeakers for interaction with the user.

Figure 8:
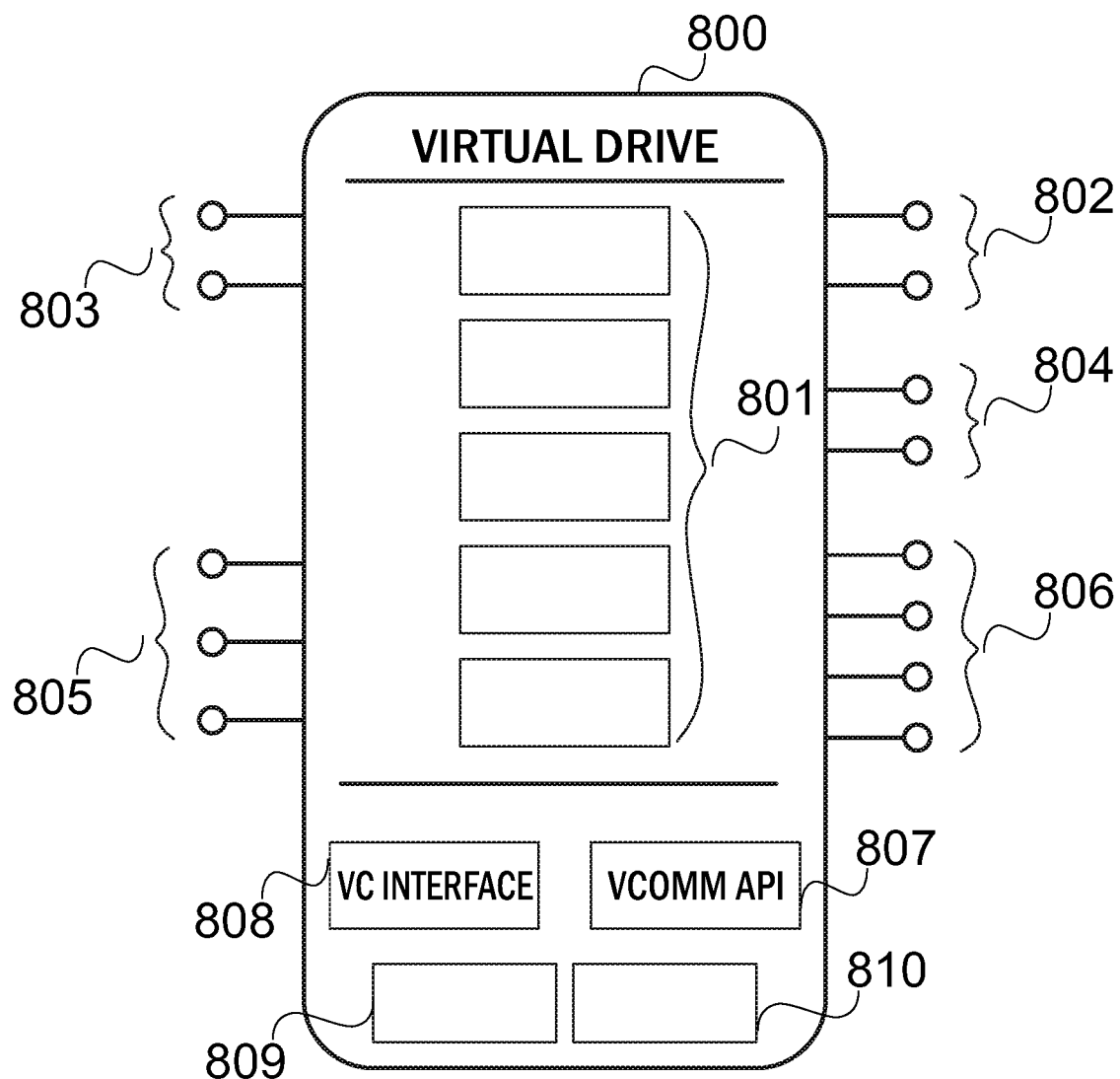
FIG. 8 illustrates one example of a virtual drive tool structural setup according to one embodiment of the present invention.

FIG. 8 illustrates one example of a virtual drive tool structural setup according to one embodiment of the present invention. In the presented example of a virtual drive tool structural setup the virtual drive tool 800 comprises one or more virtual drive service application programs 801, one or more virtual fieldbus data inputs 802, one or more virtual fieldbus data outputs 803, one or more virtual drive reference data inputs 804, one or more virtual drive sensor data inputs 805, one or more virtual drive control data outputs 806, one or more application programming interfaces (API) for virtual communication protocols 807, one or more interfaces for virtual controls (e.g. RobotStudio®, Simulink®, VirtualTime™, Virtual Console control) 808, and one or more other virtual interfaces (e.g. virtual scheduling, virtual storage) 809, 810.

With the help of the present invention the local user of the local electric drive apparatus in a local site, e.g. maintenance staff or customer, can build a local connection with the local electric drive apparatus, e.g. via Bluetooth or Wi-Fi using a mobile application or desktop application, while also having a real-time connection with remote support engineers at a remote support site.

The present invention allows the local user of the local electric drive apparatus in a local site to benefit both from remote support and from virtual drive technology. With the help of the present invention the remote support engineer can configure, during the time of remote support session, a virtual drive instance based on the downloaded parameter settings from the real drive and with other parameters, e.g. environmental parameters, if needed. Alternatively, the remote support engineer can use an previously configured virtual drive, identified by Drive unique ID, in which case only parameters needs to be synchronized with the downloaded parameter settings from the real Drive and with possible other parameters, e.g. environmental parameters.

The downloaded parameter settings may include parameters including but being not limited to: drive model parameters, drive component version parameters, functional drive parameters (including drive motor rating parameters), physical drive parameters, drive test parameters (including drive motor ID run result parameters), user generated parameters, drive application generated parameters, drive accessory parameters, drive optional module/hardware parameters (including field bus module parameters, functional safety module parameters, braking chopper parameters, I/O module parameters). The parameter settings may also include drive applications. The other relevant process information may include load information, torque information, motor speed information, power consumption information, or any other relevant process information.

With the help of the present invention the remote service engineer can combine the main drive model representing the local electric drive apparatus in a local site with real downloaded parameter settings from the real drive and build up a local virtual drive which becomes a true virtual representation of the real drive in question.

With the help of the present invention the remote service engineer can then make test runs and experiments on the virtual instance of the real drive without risks while verifying the solution before propose to the real drive user.

After having safely conducted sufficient test runs and experiments the remote engineer finds the correct parameter settings and/or other issues that are to be adjusted/corrected in order to resolve the present support concern of the local user and thus propose the relevant actions for adjustments/corrections to the local user of the drive with confidence and efficiency.

The virtual drive tool according to the present invention may also comprise a data collector for further analysis tool. Said further analysis tool may analyze the collected data for a better future service of the virtual drive tool.

With the help of the present invention the remote service engineer and the local user can enter a real time live support session with virtual drive assistance where the remote engineer can view all the parameters from the drive and propose parameter change (or any other change, e.g. restore from an old parameter backup file or reset the Drive). With the help of live support session with virtual drive assistance according to the present invention the issues can be identified co-operatively and in real time and can also be solved in real time without delay.

With the help of the solution according to the present invention, the remote support engineer is not bound to any fixed location since the virtual drive can be run in any generic computers. With the help of the solution according to the present invention, the availability of the expertise across the globe is considerably increased with lower costs of human and hardware resources.

As used in this application, the term "circuitry" refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of "circuitry" applies to all uses of this term in this application. As a further example, as used in this application, the term "circuitry'" would also cover an implementation of merely a processor (or multiple processors) or a portion of a processor and its (or their) accompanying software and/or firmware. The term "circuitry" would also cover, for example and if applicable to the particular element, a baseband integrated circuit or applications processor integrated circuit for a user apparatus or a similar integrated circuit in a service desk, or in a server.

In an embodiment, the at least one processor, the memory, and the computer program code form processing means or comprises one or more computer program code portions for carrying out one or more operations according to any one of the embodiments of FIG. 3 and FIG. 4 or operations thereof.

Embodiments as described may also be carried out in the form of a computer process defined by a computer program or portions thereof. Embodiments of the methods described in connection with FIG. 3 or FIG. 4 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

It will be obvious to a person skilled in the art that, as technology advances, the inventive concept can be implemented in various ways. The invention and its embodiments are not limited to the examples described above but may vary within the scope of the claims.

What is claimed is:

1. A method comprising:
establishing a live support session with virtual drive assistance between a first apparatus and a third apparatus in a remote support site, said first apparatus having a connection with a local electric drive apparatus in a local site, and said third apparatus having connection to a virtual drive tool for virtual drive assistance;
forwarding by said first apparatus parameter settings and other relevant process information of the local electric drive apparatus to said third apparatus;
selecting, by use of said third apparatus, an adjustment for one or more of the parameter settings of the local electric drive apparatus;
operating, using at least the selected adjustment for the one or more parameter settings, the virtual drive tool;
verifying, based on an outcome from the operation of the virtual drive tool using at least the selected adjustment for the one or more parameter settings, a proposed change to the parameter settings for the local electric drive apparatus; and
receiving, by said first apparatus, the verified proposed change to the parameter settings for said local electric drive apparatus.

2. A method comprising:
establishing a live support session with virtual drive assistance between a first apparatus and a third apparatus in a remote support site, said first apparatus having a connection with a local electric drive apparatus in a local site, and said third apparatus having connection to a virtual drive tool for virtual drive assistance;
downloading by said the third apparatus from said first apparatus parameter settings and other relevant process information of the local electric drive apparatus to said third apparatus;
adjusting, using said third apparatus, one or more of the downloaded parameter settings;
controlling and/or operating said virtual drive tool, by said third apparatus, while using at least the adjustment one or more parameter settings;
repeating the steps of both adjusting and controlling and/or operating until a performance of said virtual drive tool indicates a corrective action for an operation of said local electric drive apparatus; and
transmitting the corrective action to said first apparatus.

3. A method comprising:
starting in a first apparatus a remote support application that contains address information to a remote support site, said first apparatus having a connection with a local electric drive apparatus in a local site;
establishing a remote support session between the first apparatus and a second apparatus in the remote support site;
detecting in the first apparatus an input requesting a live support session with virtual drive assistance;
causing sending from the first apparatus to the second apparatus in the remote support session a request for a live support session with virtual drive assistance;
causing establishing, while continuing to run the remote support application and the remote support session, a live support session with virtual drive assistance between the first apparatus and a third apparatus in the remote support site, said third apparatus having connection to a virtual drive tool for virtual drive assistance;
forwarding by said first apparatus parameter settings and other relevant process information of the local electric drive apparatus to said third apparatus;
adjusting, using the third apparatus, one or more settings of the parameter settings;
operating the virtual drive tool using at least some of the forwarded parameter settings and the adjusted one or more settings;
identifying, based on an outcome from the operation of the virtual drive, a proposed change for at least one of the parameter settings for the operation of the local electric drive apparatus; and
receiving by said first apparatus the proposed change for the operation of the local electric drive apparatus.

4. The method of claim 3, further comprising:
outputting in the first apparatus information received from the third apparatus over the live support session and information sent to the third apparatus over the live support session as an aggregate information regardless of the media type of the information.

5. The method of claim 3, further comprising:
establishing a connection from the first apparatus to a fourth apparatus in a site in which the first apparatus is; and
allowing, by the first apparatus, a connection from the third apparatus to the fourth apparatus to be established via the first apparatus when the live support session is established.

6. A method comprising:
establishing a remote support session between a first apparatus and a second apparatus in a remote support site, said first apparatus having a connection with an a local electric drive apparatus in a local site;
receiving, from the first apparatus, by the second apparatus, in the remote support session, a request for a live support session with virtual drive assistance;
causing, in response to accepting the request, establishing a live support session with virtual drive assistance between the first apparatus and a third apparatus in the remote support site while maintaining the remote support session, said third apparatus being connected to the second apparatus and said third apparatus having a connection to a virtual drive tool for virtual drive assistance;
downloading by said third apparatus from said first apparatus parameter settings and other relevant process information of the local electric drive apparatus to said third apparatus;
selecting an adjustment for one or more of the parameter settings of the local electric drive apparatus; and
controlling and/or operating said virtual drive tool, using at least the selected adjustment for the one or more parameter settings, by said third apparatus to provide assistance to a user of said first apparatus.

7. The method of claim 6, further comprising:
outputting in the third apparatus information received from the first apparatus over the live support session and information sent to the first apparatus over the live support session as an aggregate information regardless of the media type of the information.

8. The method of claim 6, further comprising when the live support session is established:
causing establishing a connection from the third apparatus to a fourth apparatus in a site in which the first apparatus is via the first apparatus by using an existing connection established between the first apparatus and the fourth apparatus.

9. A computer program product comprising a non-transitory computer-readable storage medium having stored thereon computer program instructions which, when run by at least one processor, cause the at least one processor to:
- establish, when a remote support application that contains address information to a remote support site is started in a first apparatus comprising the processor and having a connection with a local electric drive apparatus in a local site, a remote support session between the first apparatus and a second apparatus in the remote support site;
- cause sending, in response to detecting an input requesting a live support session with virtual drive assistance, from the first apparatus to the second apparatus in the remote support session a request for a live support session with virtual drive assistance;
- cause establishing, while continuing to run the remote support application and the remote support session, a live support session with virtual drive assistance between the first apparatus and a third apparatus in the remote support site, said third apparatus having a connection to virtual drive tool for virtual drive assistance;
- forward by said first apparatus parameter settings and other relevant process information of the local electric drive apparatus to said third apparatus;
- cause, upon adjustment of one or more of the parameter settings, operation of the virtual drive tool using at least the adjusted one or more parameter settings;
- cause verification, based on an outcome from the operation of the virtual drive tool, a proposed change to the parameter settings for the local electric drive apparatus; and
- receive by said first apparatus the proposed changed to the parameter setting.

10. A computer program product comprising a non-transitory computer-readable storage medium having stored thereon computer program instructions which, when run by at least one processor, cause the at least one processor to:
- establish a remote support session between a first apparatus and a second apparatus in a remote support site, said first apparatus having a connection with an a local electric drive apparatus in a local site, and said second apparatus comprising the processor;
- detect, whether or not a request for a live support session with virtual drive assistance received by the second apparatus in the remote support session from the first apparatus is accepted;
- cause, in response to the request being accepted, establishing a live support session with virtual drive assistance between the first apparatus and a third apparatus in the remote support site while maintaining the remote support session, said third apparatus being connected to the second apparatus and said third apparatus having connection to a virtual drive tool for virtual drive assistance;
- download by said third apparatus from said first apparatus parameter settings and other relevant process information of the local electric drive apparatus to said third apparatus; and
- control and/or operate said virtual drive tool by said third apparatus, wherein the virtual tool applies, for at least one of the downloaded parameter settings, an adjusted parameter setting to the virtual drive tool, in connection with assistance being provided to a user of said first apparatus.

11. A user apparatus comprising at least one processor, and at least one memory including computer program code, wherein the at least one memory and the computer program code are configured to, with the at least one processor, cause the user apparatus at least to:
- start in the user apparatus a remote support application that contains address information to a remote support site, said user apparatus having a connection with a local electric drive apparatus in a local site;
- establish a remote support session between the user apparatus and a second apparatus in the remote support site;
- send, in response to detecting in the user apparatus an input requesting a live support session with virtual drive assistance, from the user apparatus to the second apparatus in the remote support session a request for a live support session with virtual drive assistance;
- establish, while continuing to run the remote support application and the remote support session, a live support session with virtual drive assistance between the user apparatus and a third apparatus in the remote support site, said third apparatus having a connection to a virtual drive tool for virtual drive assistance;
- forward, by the user apparatus parameter settings and other relevant process information of the local electric drive apparatus to said third apparatus; and
- receive, by the user apparatus assistance from said third apparatus controlling and/or operating said virtual drive tool a verified proposed change to the parameter settings for the local electric drive apparatus based on an outcome of operation of the virtual drive tool.

12. The user apparatus of claim 11, wherein the at least one memory and the computer program code are configured to, with the at least one processor, further cause the user apparatus at least to output in the user apparatus information received from the third apparatus over the live support session and information sent to the third apparatus over the live support session as an aggregate information regardless of the media type of the information.

13. The user apparatus of claim 11, wherein the at least one memory and the computer program code are configured to, with the at least one processor, further cause the user apparatus at least to:
- establish a connection from the user apparatus to a fourth apparatus in a site in which the user apparatus is; and
- allow a connection from the third apparatus to the fourth apparatus to be established via the user apparatus when the live support session is established.

14. A server apparatus in a remote support site, the server apparatus comprising at least one processor, and at least one memory including computer program code, wherein the at least one memory and the computer program code are configured to, with the at least one processor, cause the server apparatus at least to:
- establish a remote support session between a first apparatus and the server apparatus, said first apparatus having a connection with an a local electric drive apparatus in a local site;
- detect, whether or not a request for a live support session with virtual drive assistance received in the remote support session from the first apparatus is accepted;
- cause, in response to the request being accepted, establishing a live support session with virtual drive assistance between the first apparatus and a third apparatus in the remote support site while maintaining the remote support session, said third apparatus being connected to the server apparatus;

download from said first apparatus parameter settings and other relevant process information of the local electric drive apparatus to a virtual drive tool in said server; and control and/or operate said virtual drive tool using, for at least one parameter setting of the downloaded parameter settings, an adjusted parameter setting to provide assistance to a user of said first apparatus.

15. A system comprising at least:

one or more sites, a site comprising one or more devices that comprise one or more wireless interfaces to enable local connections;

one or more service centers, a service center providing a remote support site, comprising at least a server and one or more service desks, and being configured to support remote maintenance of at least the one or more devices and to establish, when in an existing remote maintenance session a request for a live support session with virtual drive assistance is received, a live support session with virtual drive assistance while maintaining the existing remote maintenance session; and one or more user apparatuses, a user apparatus being configured to establish a remote maintenance session to a service center amongst the one or more service centers, to establish a local connection to at least one of the one or more devices when the user apparatus locates in the site, and to send to the service center a request for a live support session with virtual drive assistance in an existing remote maintenance session to the service center, and to establish, while maintaining the remote maintenance session, a live support session with virtual drive assistance to the service center, wherein the one or more service desks are configured to (1) download from said user apparatus parameter settings and other relevant process information of the local electric drive apparatus to a virtual drive tool in said one or more service desks, (2) adjust at least one parameter setting of the downloaded parameter settings, and (3) operate said virtual drive tool using at least the adjusted parameter setting to generate a proposed change to the parameter settings for the local electric drive apparatus.

16. The system of claim 15, wherein the user apparatus is further configured to allow the service center to use the local connection to access the at least one of the one or more devices during the live support session with virtual drive assistance.

17. The system of claim 15, wherein:

the remote service session is between the user apparatus and the server;

the server is configured at least to detect a request for a live support session with virtual drive assistance and to trigger establishment of the live support session with virtual drive assistance between the user apparatus and one of the one or more service desks; and the user apparatus is further configured to request the live support session with virtual drive assistance from the server, to establish the live support session with virtual drive assistance to the one of the one or more service desks, and to and to forward parameter settings and other relevant process information of the local electric drive apparatus to a virtual drive tool in said one or more service desks and to receive assistance from said one or more service desks controlling and/or operating said virtual drive tool.

18. The system of claim 17, wherein:

the user apparatus is further configured to output information received from the one of the one or more service desks over the live support session with virtual drive assistance and information sent to the one of the one or more service desks over the live support session with virtual drive assistance as an aggregate information regardless of the media type of the information; and the one or more service desks are configured to output information received from the user apparatus over the live support session and information sent to the user apparatus over the live support session with virtual drive assistance as an aggregate information regardless of the media type of the information.

* * * * *